United States Patent Office 3,600,479
Patented Aug. 17, 1971

3,600,479
METHOD FOR UNIAXIALLY AFTER-STRETCHING A TUBULAR FILM
Masahide Yazawa and Haruhisa Tani, Tokyo, Japan, assignors to Polymer Processing Research Institute Ltd., Tokyo, Japan
Filed Oct. 30, 1969, Ser. No. 872,579
Claims priority, application Japan, Nov. 12, 1968, 43/82,729
Int. Cl. B29d 7/16, 7/24
U.S. Cl. 264—25
14 Claims

ABSTRACT OF THE DISCLOSURE

Method for producing at least one sheet of uniaxially oriented film having no appreciable extent of biaxial molecular orientation which is harmful to fibrillation, by after-stretching a tubular film longitudinally in the original tubular state during the pass from feeding pinch rollers to take-up pinch rollers in the primary after-stretching, which comprises sliding it over the outside periphery of a horizontal circular guide mounted on a vertical elongated support at a temperature as close to room temperature as possible in order to recover the original round state from a flatly folded state; heating it uniformly up to a temperature sufficient for after-stretching so as to start rapid stretching all at once from a circumference lying at substantially the same level and cleaving the stretched film. The invention also may include the above-mentioned primary after-stretching and the secondary stretching carried out at a higher temperature than the primary after-stretching between another set of feeding pinch rollers and taking-up pinch rollers.

The present invention relates to a method for preparing evenly—and uniaxially—well oriented films of a broad width or a number of narrow films of desired width. More particularly, the present invention relates to a method for uniaxially afterstretching a tubular film of a large diameter in the longitudinal direction, which film has been shaped by a blown method, during its travel in the direction of the length while keeping its tubular form after recovering this form from a flatly folded taken up state, and reducing its diameter in inverse proportion to the square root of the ratio of stretching, to such an extent that the after-stretched tubular film is evenly and uniaxially well oriented and becomes easily cleavable in the direction of orientation and also to a method for preparing two sheets of evenly and uniaxially oriented film in a piled up state by cleaving the film along two lines which form both the selvedges when taken up in flatly folded state or a sheet of twice as wide as the above-mentioned sheet by cleaving a tubular film along one line on the circumference of the after-stretched tubular film in the direction of stretching and taking up in flatly folded state by pinch-rollers followed by unfolding the cleft film. The present invention relates also to a method for cleaving an uniaxially oriented film, in above-mentioned cases or in a case where uniaxially oriented film are divided into a number of narrow-tapes of desired width and subjected to a further uniaxially after-stretching at a higher temperature than that ever exposed before in the preceding after-stretching to obtain highly uniaxially well oriented tapes of high tenacity and desired width; said cleaving method comprises passing an uniaxially oriented film over a bar or a roller for slightly changing the direction of the travel of the film and blunt edge blades set in parallel on a shaft in a number corresponding to that of narrow tapes desired so as to pierce through the film at positions a short distance behind the bars or rollers. By this method the film uniaxially oriented is not slitted by cutting with the blades but slitted by cleaving with the piercing blades through the film; in the course of the said cleaving, the advancement of cleaving too much or in oblique direction is prevented by sliding the film to be cleft over a bar or a roller positioned slightly ahead of each blade by which the film slightly changes its travelling direction, and as a result, the life of the blades is extremely prolonged or becomes almost permanent compared with blades usually used in slitting by cutting.

Conventionally, when a broad film, as it is non-stretched state after being shaped, is slitted with sharp blades, such as those of safety razor, into narrow tapes and the tapes thus obtained are subjected to single-stage or multi-stage after-stretching so as to prepare stretched tapes, slitted edges of tapes thus obtained are liable to form irregularities usually referred to as notches when a film having uneven or irregular surface is slitted. Notches, however, are liable to be formed with dull or worn out blades, even when the film has an even and smooth surface. These notches become the cause of break during stretching. The narrower a slitted tape becomes, the more pronounced the effect of notches on both selvedges of the tape becomes. Contrary to the theoretical possibility of producing stretched tapes of less than 500 denier, it has been said that production of such a thinner stretched tape is not desirous practically, due to the trouble of break of the tape during stretching. Especially, slitting of a film compounded with titanium white for producing stretched tapes of dull appearance or with pigments for producing colored ones, wears the edge of a blade extraordinary faster. This has been the most notable weak-point of cutting of a film with blade.

Further it has been well-known that for manufacturing a broad film having well-controlled gauge in thickness, a conventional chill-cast method, in which a film is extruded from a well adjusted slit of a flat or T-die and quenched on chilled rollers, is considered to be one of the best methods, in spite of its expensive equipment cost and polymer losses caused by cutting-off of both the selvedges of initially extruded profile. Nowadays, however, many improvements have been made in blown methods for producing films, such as high-speed shaping method utilizing water quenching, and various methods for controlling the gauge in thickness, etc. have been developed. So it has now become clear that a newly improved blown method is able to provide a film having better controlled gauge at a cheaper cost than that by a chill-cast method.

As for uniaxially stretching, a film of less than 50 mm. in width can be so stretched that a film obtained which has ideally oriented molecules in its longitudinal direction, reduced width and thickness, each inversely proportional to the square root of the ratio of uniaxially stretching. However, if the width of raw film becomes broader, longitudinal wrinkles appear on the film in the course of stretching and moreover a certain part, that is, a part in the middle of the width of the film is so stretched that it contains transversal orientation effect of biaxial orientation in some extent, and the thickness of both the selvedges of the stretched film becomes thicker than that of the middle part even when thickness of the raw film before stretching is well controlled and the width of the film after stretching is broader than that calculated according to the above-mentioned square root rule.

When a film had uniaxial molecular orientation, partly accompanied by biaxial molecular orientation, it was found that splitting of films for even fibrillation became frequently difficult. In order to avoid such a type of stretching as abovementioned, curved bars or other means are introduced frequently in the process of uniaxial stretching. Even with such means, uniform fibrillation cannot be performed after uniaxial stretching unless a film before stretching is of 250 mm. width at the broadest.

Hitherto, the maximum width of uniaxially stretched film, capable of being well fibrillated into split fiber web suitable for making non-woven fabric which needs to have a width of more than 1 m. was only 80–100 mm., e.g. in case of films from a polyolefin polymer stretched uniaxially 9 times the original length. Accordingly, more than five webs of split fiber obtained by fibrillating stretched films of the above-mentioned size are necessary to make up such a width by arranging them side by side in parallel even when each of such split fiber webs had been spread about twice its width.

In arranging webs continuously in such a side by side manner, there are apt to occur troubles such as overlapping of one selvedge of a web over that of neighbouring one, gap-forming between neighbouring webs, the selvedges of which should have come to the position just contacting with each other, or uneven tension among webs running side by side in case of unwinding from each separate roll.

To overcome such troubles the present inventors have been engaging in comprehensive studies to find out the best way of uniaxial stretching for obtaining much wider webs of well fibrillated split fiber and such studies have resulted in the idea of the present invention.

An object of the present invention is to provide a method for producing films or tapes longitudinally stretched, having an ideal state of molecular orientation. Another object of the present invention is to provide uniaxially oriented films or tapes which have none of the defects such as irregularities or notches on their slitted selvedges and are quite suitable for making split fiber webs by fibrillation after secondary after-stretching.

According to the method of the present invention, a tubular film, shaped by a blown method after being extruded from an extruder through an annular die, is after-stretched in its longitudinal direction continuously by feeding the tubular film in a flatly pressed state vertically downwards after passing through nip of a feeding pinch roller means; sliding the tubular film over the outside periphery of a horizontal circular guide in order to recover the round state of the tubular film, which guide has a peripheral length nearly equal to the circumferential length of the film, at least one hole for balancing the pressure in the inside of the space above the circular guide with the pressure of the outside atmosphere, is supported by a vertical supporting shaft at a position apart from the outlet of the feeding pinch roller means by at least the length equal to the diameter of the circular guide, is kept at a temperature as close as possible to the temperature of the outside atmosphere and has its center on the center axis of the tubular film; heating the tubular film uniformly up to a temperature sufficient for after-stretching while allowing the tubular film to travel downwards with a profile showing a number of loose wavy folds thereupon so as to start rapid stretching all at once from a circumferential line of the tubular film at substantially the same level which results in a necking appearance on the film; cleaving the stretched film and taking up the cleft film by nip of a taking-up pinch roller means, to obtain a film having an ideal uniaxial molecular orientation without accompanying any trace of biaxial molecular orientation nor wrinkles on the film, whose width is to be reduced in inverse proportion to the ratio of the longitudinal stretching. The said film is, as an additional merit, easily cleft along its direction of stretching without inducing any notches on its newly developed edges; for instances when a water quenched tubular film of a polyolefin polymer is stretched by 4–6 times the original length of the film in its longitudinal direction, the stretched tubular film is easily cleft along the direction of stretching without using any sharp edged cutter like a knife to give a flat film after taking up. The flat film thus obtained can be subjected to successive, secondary stretching to give a highly uniaxially oriented film suitable for fibrillation.

In the above-mentioned type of cleaving among the methods of slitting a uniaxially oriented film, cleavage always advances along a line in the direction of molecular orientation in the film, slightly ahead of the cleaving means such as a blade which is so situated that it pieces the film. It hs been found that a blade applied to this way of cleaving, has no necessity of being sharpened, does not wear out at all and has a long or almost permanent life of usage. This is the most prominent merit of this way of slitting.

Especially, this way of slitting can be effectively utilized in case of preparing a number of narrow tapes from a broad film running in flat state after primary after-stretching according to the method of the present invention. If the film is slitted according to the conventional way of cutting using thin blades with their sharpened edges, these sharpened edges do not withstand the abrasive action of the film being cut, even if it is soft, in a long run and especially if the film is compounded with a coloring pigment, the edges are worn out usually within several hours. Those edges, having a short life of cutting, always leave notches on the edges of the slitted tapes, as above-mentioned, which notches become the cause of troubles of occasional breaking down of the tapes in the course of after-stretching or further after-stretching in the subsequent step.

Contrary to the above, if a uniaxially oriented film is not cut into tapes but cleft along a line in the direction of its molecular orientation, according to the method of the present invention, the slitting means need not have their edges sharpened and even a thin plate with a dull edge can be used satisfactorily for this purpose for producing narrow stretched tapes or split-fiber yarns therefrom without any trouble of breakage of tapes in the course of fibrillation or secondary stretching before fibrillation. This results in yarns with improved rates of production and operation.

In case of preparing coloured split fiber yarn from polyolefin polymer, pigmented films are usually processed because of the fact that polyolefin polymers are not easily dyed by dyestuffs, and accordingly the cleaving method in narrow tapes, of the present invention is effectively applied to the processing of this kind of film into split fiber yarns.

Further, as the slitting method of the present invention leaves no notches on the edge of the slitted tapes at all, contrary to the general opinion that it is difficult and not profiltable to produce such a thin denier split fiber yarn as below 500 denier, this invention can be said to have opened a way to commercial production of split-fiber yarns of thinner denier, as thin as 100–150 denier and accordingly promising future of split fiber yarns in the field of apparel.

Let suppose that a broad film is stretched 9 times the original length in two stages, that is, the primary stretching according to the method of the present invention and the secondary stretching at a higher temperature than that to which it has been exposed during the former after-stretching. If the primary stretching ratio is 4 times, the secondary one becomes 2.25 times and the reduction in width of the film in this stage amounts to 33% which corresponds to a value inversely proportional to the square-root of 2.25, that is 1.5, and if the primary one is 6 times, the secondary one is 1.5 times and the width reduction becomes about 17–18% which corresponds to a value inversely proportional to the square root of 1.5, that is little more than 1.21.

Usually those uniaxially stretching, where reduction in width is less than 50%, can be easily carried out with a guiding means of the film, such as curved bars etc., inserted in a course of stretching while increasing the length of the stretching course, that is, the distance between the nips of feeding and the first turning roller or taking up pinch rollers means, considering the said rate of reduction in width.

For instance, a tubular film 1250 mm. wide in flat state is stretched longitudinally 6.25 times the original length in the primary stretching, according to the present invention, to produce a film in two layers piled one upon another having a width of 500 mm. in flat folded state. If the folded film is cut along a line in the direction of its length, the film thus obtained, after taking up, can be unfolded and spread into a wide uniaxially stretched film of 1000 mm. in width. The film is subjected to subsequent secondary stretching to attain total stretching ratio of 9 times. The uniaxially oriented film thus obtained, the width of which is reduced to 833 mm., is fibrillated into a wide web of split fiber suitable for a raw material of non-woven fabric of 1–2 metre in width.

The production of such a broad uniaxially oriented film suitable for fibrillation from a film prepared by a conventional chill-cast method is almost impossible due to the effect of accompanied biaxial orientation as above-mentioned.

Moreover, there is a further merit in the method of the present invention in that width of the stretching unit is about half as wide as that of the conventional unit necessary to stretch a film of the equal effective width, because in the former method, the film is a folded tubular form and accordingly the cost of commercial unit of the former method must be cheaper than that of the latter.

The features of the method of the present invention will be explained in details referring to the annexed schematic drawings, showing several preferable embodiments of the present invention and a method how to cleave an uniaxially stretched film.

Figure 1A:
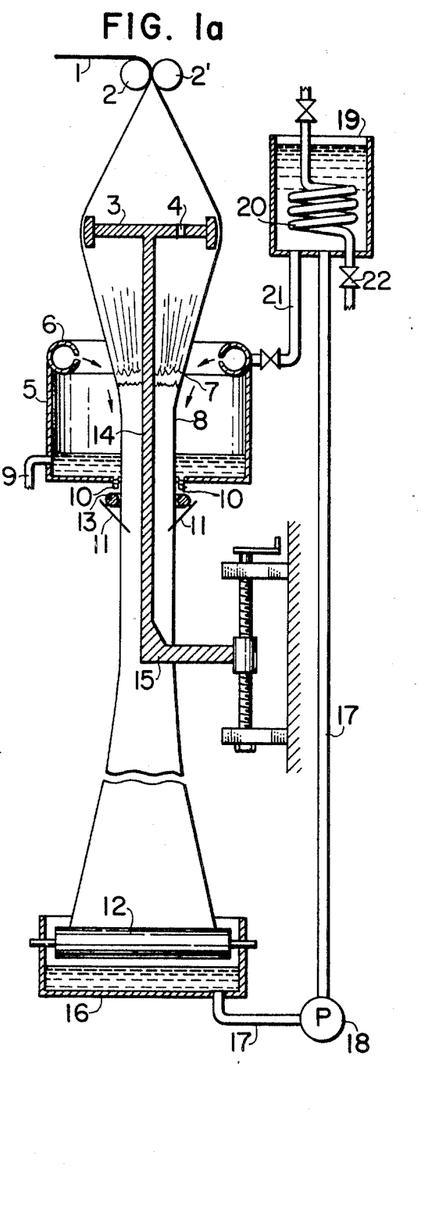
FIGS. 1a and 1b show methods wherein heating fluid is a liquid and supplied to the outside surface of the tubular film under stretching.

In FIG. 1a, a tubular film 1, which has been shaped and folded in flat form, is introduced between the nip of a set of feeding pinching rollers 2, 2' and travels vertically downwards, to slide over the outside periphery of a circular guide 3 which is situated below the pinching means and maintained at about room temperature. The circular guide has almost an equal outside peripheral diameter to the diameter of the original tubular film and is made of a metal, the outside surface of which is made rough, fluted, covered with a cloth, or coated with a fluorine containing polymer and the temperature of the guide should be maintained at a temperature as low as possible preferably close to room temperature. If the temperature of the guide becomes higher, the film begins to be stretched at a line of contact with the guide or at a line just after the pass of the film over the guide, and is prevented from free reduction of its diameter in proportion to the square root of stretching ratio by said guide and thus lateral orientation is introduced to some extent into the film which is under stretching.

The circular guide 3 has its center on the center line of the flatly folded tubular film and it is supported by a supporting shaft 14 inserted from down below and has at least one hole for balancing the inner pressure of the space over the guide with the outside atmosphere lest said space should be evacuated.

The tubular film, after sliding over the circular guide, is then introduced into a cylindrical heating chamber 5 from its top, which lies at a certain distance below the guide, surrounds the tubular film coaxially and has, on the upper part of its inside surface, a ring shaped pipe 6, having a number of small holes drilled on the inside peripheral surface thereof to spray hot water onto the outside surface of the tube and a drainage means 9 at its lower end to flow out an excess of hot water and an exit hole 10 for the tubular film after stretched.

The tubular film 1 in non-stretched state, after sliding over the circular guide 3, travels downwards by the pulling action of a take-up pinching means 12, resulting in a number of large wavy loose longitudinal folds on its surface till it touches with hot water sprayed from the ring shaped pipe 6. By the spraying of a sufficient amount of hot water, the tubular film is heated up to a temperature sufficiently high for starting stretching.

The stretching continues freely for a short distance, showing a necking appearance and the large wavy loose longitudinal folds on the tubular film rapidly become smaller and at last disappear giving truly circular cross section and reducing the diameter of the tubular film to a value obtained by dividing the original diameter of the tubular film before stretching by the square-root of the stretching ratio.

Thus the uniaxially oriented tubular film 8, having the above-mentioned diameter is obtained, after forming a trumpet-shaped converging profile like a gingko-leaf in the longitudinal cross section.

The distance necessary for stretching, that is, the distance from the line of the tubular film being sprayed to the line where the tubular film acquires the ultimate diameter and the gradient of shrinking curve of diameter of the tubular film may vary, according to operation speed of stretching, temperature of the heating medium, thickness of the film, and properties of the film and the polymer of the film, etc. For instance, the higher the operation speed is, the longer the shrinking curve is, or the slower the operation speed and the higher the temperature of the heating medium, the steeper the gradient of the shrinking curve.

It is preferable to make the height of the heating chamber 5, from the circular pipe 6 to the bottom hole 10, at least equal to a length, necessary for making the diameter of the film reach the smallest value in the shrinking curve.

A little higher height is permissible. In this case excessive liquid remaining in the chamber, if the heating fluid is a liquid, is discharged through a drainage pipe 9, situated at a certain height from the bottom, so that the liquid pressure imparting upon the traveling film is never raised so high as to cause the deformation of the tubular film. Even if the height of the chamber is relatively high, deformation, however, will not occur easily because of the large longitudinal stretching tension imparted upon the film.

Generally, it is preferable to make the height of the chamber greater than the diameter of the original tubular film before stretching and the diameter of the bottom hole 10 equal to that of the tubular film after stretching, that is, the value obtained by dividing the diameter of the original film with square root of the ratio of after-stretching, because the film is stretched without any obstacles in its inner space which hinders the free reduction of its diameter.

If slant grooves are cut on the inner wall of bottom hole 10, the greater part of heating medium leaks downwards through the said grooves and prevents the film from being cooled. In place of such grooves, a rough cloth or cylindrical net is inserted between the film and the wall of the bottom hole, which diameter, in this case, should be a little larger than that of stretched tubular film.

The tubular film thus stretched is taken up by nip of pulling or take up pinching means 12 after divided into two films along the lines corresponding to the edges folded by the nip. This dividing is not carried out by cutting with sharp edged knives but by cleaving with thin blades not so sharp under the condition that the film is sufficiently stretched.

As cleavages advance ahead of the tip of the blades, a guide ring having a little smaller inside diameter than that of the film, after stretching, is installed shortly ahead of the blades to slide the film over this guide ring so as to prevent the cleavages from advancing aslant to the predetermined cleaving line or too far from it.

The cleavages on the film are stopped at the contacting points of the film with this guide ring and there is no fear that the cleavages may go too far or aslant.

Figure 1B:
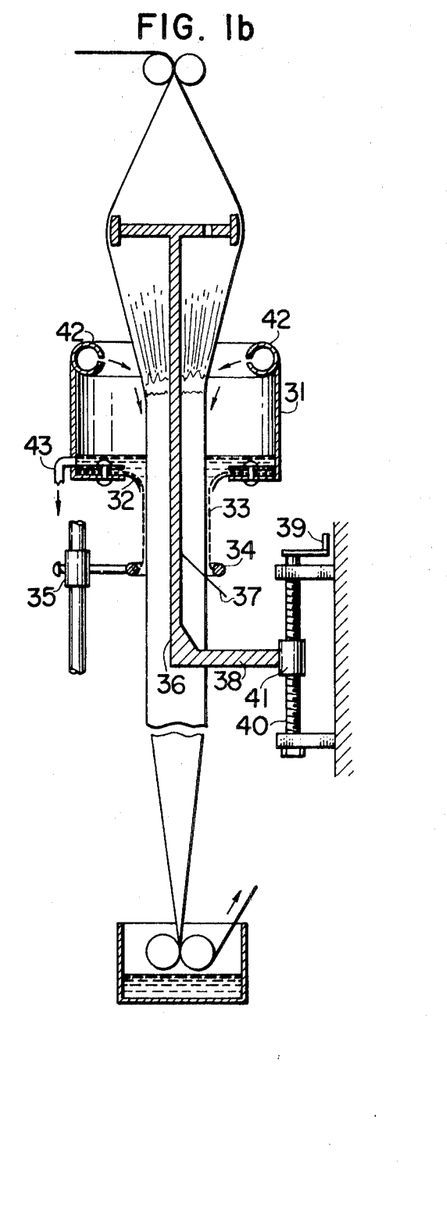

In FIG. 1 the above-mentioned guide ring contacts with the film from the outside but it is also preferable to set a guide ring which is supported on the inner supporting shaft 14 so as to contact lightly with the film from the inside.

The supporting shaft 14, installed in the inside of the tubular film, is connected to an arm 15 inserted from the outside into the inner space at a position where the cleft film is widened by guide bars situated below the cleaving means (not shown in the figure) and the films divided in two sheets after passing over the guide bars are introduced into the nip of the pulling or pinching means.

The mechanism for moving the supporting shaft 14 upwards or downwards, is explained later.

Hot water, flowing down on the surface of the film is squeezed by pinching roller means 12 and at last falls into bottom reservoir 16 and is pumped up via a piping 17 by a pump 18 into a head tank 19, where the water is reheated up to the predetermined temperature by a heater, such as electric heater or a heating steam coil 20. Thus heated water at predetermined temperature is fed onto the film in the heating chamber 5 through a number of small holes of a ring pipe 6. The drain from the heating coil is thrown away or led into the bottom reservoir through a trap valve 22.

The apparatus illustrated in FIG. 1b is different from that shown in FIG. 1a, in its design of the bottom hole of the heating chamber. The bottom hole shown in FIG. 1a has a fixed diameter as above-mentioned. It is necessary to use a heating chamber each having a different bottom hole diameter whenever the stretching ratio is changed, but in the design shown in FIG. 1b the diameter of the bottom hole is variable in some extent.

In FIG. 1b, onto a flat bottom annular rigid plate of a cylindrical heating chamber 31 (5 in FIG. 1a), an elastomer plate 32, having a hole, smaller than the hole of the rigid bottom plate which is larger than the tubular film already stretched is set concentrically with the rigid plate, and the peripheral end of a cylindrical net 33 is clamped between the rigid and elastomer plates. By adjusting the position of the level of an arm 35, which supports a ring 34 fixed to the lower end of the cylindrical net 33, the tension imparted onto the net can be adjusted in order to change the opening diameter of the hole of the elastomer plate at will according to the stretching ratio desired. Thus the diameter of the bottom elastomer hole can be changed so as to match with a comparatively wide range of stretching ratio of a tubular film; this is a notable merit of this design.

The depth of hot heating liquid accumulated in the bottom of the heating chamber 31 after sprayed from a ring shaped pipe 42 (6 in FIG. 1a) onto the outside surface of the downwardly travelling tubular film is so controlled that it does not deform the diameter of the film passing therethrough by flowing the surplus liquid away through an overflow pipe 43. A large portion of the liquid leaks through the meshes of the net 33 existing between the film and the elastomer hole and flows downwards covering the whole surface of the film. Channeling of flow is prevented by the net and thus the temperature of the film can be maintained by the leaking liquid.

However, since the ring 34 has a fixed diameter, it is necessary to change the ring in accordance with the change of the stretching ratio or to throttle the diameter of the net at a part of the net a little upper from the ring with some throttling means, such as rubber ring band so as to make the diameter of the lower part net to match with that of the stretched film and not to make the net to part from the tube because the diameter of the stretched tubular film becomes smaller as the stretching ratio is increased.

If the throttling effect is so increased as to give an effective sliding friction on the surface of the film passing through the inside of the net, the film can be cleft with a single blade 37 set on the support 36 (in FIG. 1b) and by using the above-mentioned throttling means in place of lower guide ring 13 of FIG. 1a in preventing the cleavage from going aslant or too far. Thus it is possible to impose uniform stretching tension upon the circumference of the film. In case of FIG. 1b, the film is cleft along only one line lying in the center of the film taken up in flat state by the nip of pulling or pinching roller means and after cleft, the arm 38, which supports the supporting shaft 36 of the inner guiding ring (4 in FIG. 1a) and the cleaving blade, is inserted at right angle to the axis of the pinching roller means into the inner space of the tubular film through the cleft gap widely opened by guide bars. Then the stretched film thus cleft is taken up by the nip of pulling or pinching roller means in a flat state and after passing through this means the film is unfolded and spread to give a broad flat film of doubled width as compared with the width of the film in flatly folded state.

The position of the upper circular guide (4 in FIG. 1a) is adjusted upward or downward by a revolving handle 39 (FIG. 1b). The handle rotates a threaded shaft 40 which induces the vertical up and down motion of a boss 41, to which the arm 38 is fixed.

A supporting shaft 36 (14 in FIG. 1a) is fixed on the arm 38.

Figure 2:
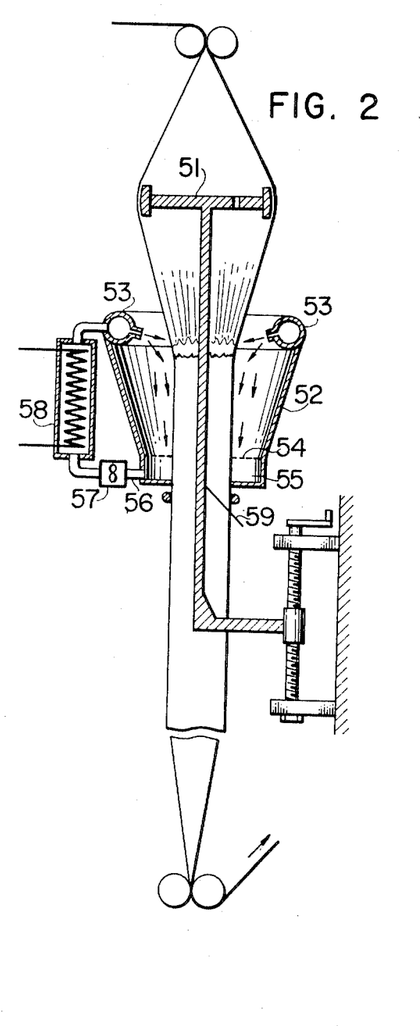
FIG. 2 shows a method wherein heating fluid is a hot air and supplied to the outside surface of the tubular film under stretching.

FIG. 2 illustrates a method wherein heating of the tubular film is carried out from the outside by circulating a hot gas and otherwise the operation is carried out by almost the same manner as in case of FIG. 1a or 1b.

Hereinunder, description is made only to the characteristic heating method of this case.

A tubular film, after sliding over an upper circular guide 51 which is situated in the inside of the film and heat-insulated, if necessary, comes to show an appearance having a number of large wavy loose folds on its surface in the course of its downward travelling and after introduced into a center hole of a cover of the heating chamber 52, which hole is so made that it fits well with the wavy loose folds of the film, the descending film is heated from the outside by a vapor of less than 100° C. or hot air, blown off from a number of small holes drilled on the inside peripheral surface of a ring pipe 53 fixed at the circumference of the upper end of the heating chamber.

After heated to a certain temperature, by a hot gas flowing in the same direction with the film, the film begins to be stretched from a circumferential line lying on the same level, showing necking appearance and the wavy loose folds on the surface rapidly decreases its height and at least disappears and the film becomes smooth and truly circular. The diameter of the film, after stretching, reduces to a value almost equal to that obtained by dividing the diameter of the original film before stretching by square-root of the stretching ratio.

The route of converging tubular film in the course of stretching, varies according to the temperature and amount of hot gas blown onto the film, and travelling speed or thickness of the film etc.

At any rate, so long as almost all the converging of a part of the film, namely stretching of the said part of the film is not finished and still going on, the heating chamber should be so designed that the said part of the film does not come out of the chamber or exposed to the cold outside atmosphere.

The hot gas after finishing the heating, is drawn out through a number of small holes 54 at the bottom of the heating chamber into an annular duct 55 and sent to a ring pipe 53 by means of a blower 57 after passing through a piping 56 and a chamber 58 heated by electricity and circulated in cycle as shown in FIG. 2.

At the center of the bottom of the heating chamber, there is formed a hole, surrounded by the annular duct, the inner diameter of which hole is, in this case, a little smaller than that of the film after stretched and a short distance downwards and apart from the said hole, there is fixed a blade 59 on the inner support: This blade cleaves the film.

Figure 3:
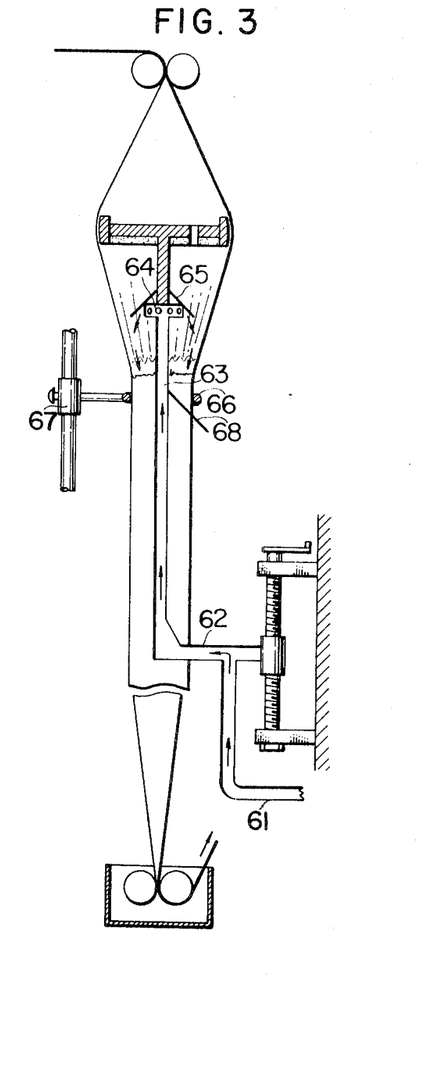
FIG. 3 shows a method wherein heating fluid is a hot liquid or gas and supplied to the inside surface of the tubular film under stretching.

FIG. 3 illustrates the case where a tubular film, after sliding over an insulated inner circular guide, is heated from the inside by the ejection of hot heating fluid thereupon.

The supporting shaft 63 of the inner circular guide is a pipe through which a hot heating fluid flows to heat the tubular film from the inside, through this pipe of supporting shaft 63 a hot heating fluid, for instance such as a vapour or a hot liquid below 100° C., supplied from a flexible piping 61 via a hollow arm 62 holding the supporting shaft 63, is supplied to a distributor 64 fixed on the supporting shaft, and having a number of small holes on its outside surface and situated just under a cone shield 65 fixed on the same supporting shaft. The hot heating fluid is ejected from the above-mentioned small hole onto the inner surface of the film and the cone shield 65 prevents the inner circular guide situated above the cone shield from contacting with the heating fluid and helps to eject the heating fluid only onto the film.

The hot heating fluid flows down along the inner surface of the film and heats it till it reaches an appropriate temperature for stretching. The stretching begins from the circumferential line lying almost on the same level showing a necking appearance.

The film, after sliding over the inner circular guide, and before contacting with the hot heating fluid, shows a number of large wavy loose folds on its surface. On contacting the fluid, the film is pressed to the outside by the pressure of ejected fluid but the deflection of the film is not so great that the wavy loose folds cannot be stretched out by the strong stretching tension imposed upon the film.

In case of heating by a liquid, most of the liquid flows down along the inside surface of the film and in case of heating by hot gas, the gas heats the film without trouble of non-uniform heating because it flows in turbulent-flow. Although lines of necking where stretching suddenly begins, may be on somewhat different levels from each other, in the above-mentioned two cases, reduction of diameter is carried out smoothly because there is nothing to prevent the stretching of the film after passing over the upper circular guide and finally the film recovers its true round state. The diameter of this round state will be a value obtained by dividing the original diameter of a tubular film before stretching by square-root of the stretching ratio.

FIG. 3 illustrates the case where, the film is cleft open after stretched, by a blade 68 and a ring 66 which contact with the film from the outside and fixed on an arm 67 and is placed a little above the said blade to prevent the cleavage from going aslant or too far as shown in other drawings.

In case shown in FIG. 3, it is difficult to circulate and re-use the hot heating fluid when it is gaseous. Some additional device will be necessary for such purpose but in case of heating by a liquid, such as hot water, it is easy to circulate the liquid because almost all the liquid ejected onto the film is collected and recovered in the reservoir, placed beneath the taking up pinchnig roller means. The apparatus illustrated in FIG. 3, which uses a hot liquid in heating the film, such as hot water, is the simplest and most convenient one among various apparatuses.

There is one problem to be noted and added here. That is the length of the part of the film between the upper circular guide and a line from which heating of the film begins. The length of this part should be made sufficiently long. It should be at least equal to the diameter of the film before stretching. Precaution should be taken not to select too short a length because too short a length causes a restricted converging of the film in the course of stretching and induces some effect of biaxial-orientation in the film.

As for the distance from the outlet of the feeding pinching means to the contact zone of the tubular film with the periphery of the upper circular guide, precaution should be taken likewise.

This distance is made to be at least equal to the diameter of the film before stretching in tubular form, that is nearly equal to the diameter of the upper circular guide, so that the film recovers the true round tubular form without any undesirable effect on the film.

The examples afore-mentioned have revealed various heating methods of the film using various hot fluids e.g. hot air, and hot liquid. But such heating methods can be replaced by infra-red radiation heating from the inside or the outside or both the sides. In the heating of this kind, processing can be carried out neatly but heating which uses the energy transformed into infra-red ray from electric energy is expensive due to low efficiency of transformation and can be applied only to an equipment having a comparatively small capacity.

Figure 4:
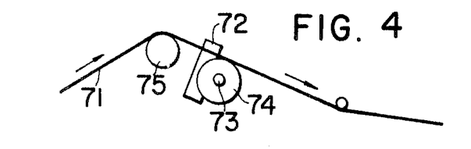
FIG. 4 shows how a uniaxially stretched film is cleft with a blade.

FIG. 4 illustrates a method for cleaving the tubular film having been sufficiently stretched so as to be able to cleave easily according to the method of the present invention.

A film 71 having been sufficiently stretched as above-mentioned travels over a fixed shaft 73, which is positioned at right angle to the travelling direction of the film and on which a number of razor blades 72 are set in a row. Each of the said blades is held between neighbouring distance-pieces 74 with a regular interval corresponding to the width of the tape to be prepared. Thus they pierce the film, when it travels over the fixed shaft 73.

With the travel of the film the blades do not act to cut it, but act to cleave it. Each cleavage induced by the blades advances toward the feeding side of the film before the edge of the blade comes to the very spot of cleaving, as if driven by a wedge; hence the edge of the blade does not contact with the film. Thus the life of the blade is prolonged and becomes almost permanent.

Depending upon the property of the stretched film, however, the above-mentioned cleavage often goes aslant or too far towards feeding side of the film. In order to prevent such undesirable cleavage, a sliding bar or guide roller 75 is installed at a short distance apart from and in parallel to the row of the blades on the shaft in the feeding side of the film and the course of travelling film is slightly deflected. By contacting the film with the bar or a roller 75, the cleavage on the film is prevented from going too far from the very point of the contact and thus tapes, having regular width corresponding to the intervals of the blades are obtained.

Although slitting a film looks to be a very simple process, the slitting is one of the most important processes in the after-stretching of a film.

In case of usual way of slitting, such as by cutting with sharp edge of a blade, or by shearing with a set of sharp shearing edges, a non-stretched film, especially pigmented film, for example, that of a polyolefin polymer which is not easily dyeable, or titanium-white-containing dull or mat film, wears out and damages the cutting or shearing edges very rapidly, say within several hours of slitting by the abrasive action of the film.

If a film is slitted with such a worn out edge, edges of slitted product are damaged and have severe notches, that is, faults or irregularity of edges usually appear. Products having those notches are usually broken in the course of stretching. Accordingly, the choice of method for slitting is one of the very important problems in the production of split fiber webs or yarns, especially of thinner denier, particularly in connection with operation rate and yield of product.

In this connection, it is believed that stretching of a broad tubular film according to a method of the present invention, in the primary after-stretching, slitting thus obtained stretched film by a method shown in FIG. 4, and subsequent secondary stretching carried out for producing uniaxially well oriented tapes suitable for fibrillation, is a novel and the most economical process because it enables to produce stretched tapes or split fiber webs in mass production manner at cheaper cost.

EXAMPLE 1

A water quenched tubular film of high density polyethylene 1 meter wide in flatly folded state and 0.05 mm. thick was introduced into a pinch roller means 2,2' using an equipment illustrated in FIG 1a and sent downwards at a speed of 20 meter per minute.

After sliding over an inner circular guide 3, fixed about 80 cm. below the pinch roller means and having an outside peripheral length of 635 mm. and horizontally fluted outside wall of 30 mm. height, a film was introduced into a heating chamber 5 of 50 cm. height, the upper surface of this chamber was 50 cm. below the circular guide. The film, which was sprayed with hot water on its outside surface during the pass through the chamber and kept at 90° C., was stretched by taking up with pulling pinch roller means at a peripheral speed of 125 meter per minute. The calculated ratio of stretching was 6.25.

At the inlet of the heating chamber, the profile of the film section showed large wavy loose folds and the apparent diameter of the film was reduced. Shortly after contact with hot water, the film was rapidly stretched, with reduced evidence of necking appearance and the wavy loose folds. Finally, the film became a stretched tubular film having a true circular section of 25.5 cm. in diameter; this corresponds to a value obtained by dividing a circumferential length of 2 meters before reaching the heating chamber by $\pi$ and square root of stretching ratio of 6.25.

The heating chamber had a overflow pipe 9, 30 mm. above its bottom and the heating hot water fed into this chamber was discarded from this over-flow pipe except the one leaking through the bottom hole of the chamber and flowing along the stretched film. The head of 30 mm. of remaining hot water in the chamber did not deform the stretched film at all.

At 50 cm. below the bottom hole, a guide ring 13 was set in order to make the film slide over its outside periphery and two blades 11 were set on the ring on symmetrical positions with each other against the center axis of the travelling tubular film, as shown on the drawing, to cleave the film at two points lying each on a respective line corresponding to each selvedge of the film after passing through the nip of the taking up pinch rollers. The cleavage was prevented from going too far by contacting the film with the ring.

In this case of stretching it is presumed that the film was stretched uniformly all over the whole circumference of the film because the upper circular guide 3 and the guiding ring 13 had been positioned concentrically.

Two hemicircular stretched films, thus divided, were taken up in two flat sheets each 40 cm. wide and piled one on another, after being guided with several sets of bars positioned transversely to the traveling direction of the film.

Two sheet of the films thus obtained were subjected to the subsequent secondary stretching after being arranged to travel side by side in parallel by guide bars and rollers.

A hot air chamber 4 meters long installed between two sets of outside pinch roller means and equipped with two sets of rollers each having two rollers of 250 mm. in diameter (one set was at the inlet-side and the other at the outlet-side and two sets were 3.5 meter apart from each other in the chamber) was used for secondary stretching.

The films arranged side by side in parallel were introduced into the chamber after passing through the nip of feeding outside pinching means and heated from both surfaces by hot air jet at 125° C. ejected from two hot air pipes positioned above and below the film at the inlet. The films were additionally stretched by being assisted by several number of bars at the inlet so as to attain stretching of 9 times the length of the nonstretched film in total, during the passage through the chamber in which the films were changed their direction of travel in zigzag way by turning around the rollers and taken up by pinch roller means situated at the outside of the outlet of the heating chamber.

The films thus obtained, each having width of 332–334 mm., were uniaxially well oriented without accompanying almost any effect of biaxial orientation and suitable for subjecting to subsequent step of fibrillating process.

The thus uniaxially well oriented films, running in parallel side by side were slide-rubbed with a revolving splitter 1 meter long and 75 mm. in diameter, having rough surface like a file, with forming an angle of 80° between inlet and outlet sides of said films. The surface velocity of the splitter was twice the travelling velocity of the film. The travelling velocity of the film was 180 meter per minute.

Each film was fibrillated into split fiber web having a network structure of fibers of 20–30 denier in average. Two sheets of thus obetained split fiber web running in parallel were so rearranged by guide rollers that one selvedge of one of the webs was so close as about to touch its neighbouring selvedge of the other web. Then two sheets of split fiber web were jointed each other along the selvedges with a hot melt type adhesive binder. After passing through a set of pressing pinch rollers, to flatten the line of joint, a split fiber web 670 mm. wide having a joint line in the center was obtained at a speed of 180 meter per minute.

The broad split fiber web thus obtained was subjected to 1.5 to 2.5 times spreading by passing through an air duct through which a high speed air was flowed and after spreading, the web was sized with an adhesive binder to fix its network construction.

When onto one sheet of split fiber web thus obtained, running as a warp web, sheets, cut in the length corresponding to the width of the warp from another split fiber web equally obtained, was laid and pressed with hot rollers, a strong nonwoven sheet, 1–2 meter wide, suitable for reinforcing packaging papers was obtained.

EXAMPLE 2

A water-quenched polypropylene tubular film 1 meter wide in flatly laid state and 0.06 mm. thick was stretched by 4 times longitudinally in the primary stretching under almost the same conditions with those of Example 1, using an apparatus illustrated in FIG. 1b and a uniaxially oriented film 500 mm. wide in flatly laid state was cleft along a line shown in the drawing. The distance from feeding pinch rollers to taking up pinch rollers of the apparatus was about 4 meter. The folded film obtained was unfolded and opened into a flat film 1 meter wide in the following step and slitted into 100 tapes of 10 mm. width according to the method illustrated in FIG. 4. The tapes thus obtained were subjected to subsequent secondary stretching followed by simultaneous heat setting with an apparatus stated in Example 1, except that the temperature of stretching was 147° C. The total stretching ratio was 9 times the original length of the quenched film and after fibrillation with the same apparatus with that stated in Example 1, 100 split fiber yarns of 1000 denier were obtained at a speed of 180 meter per minute.

In one example of processing with the same apparatus stated above, the film, after primary stretching, was slitted into 200 tapes of 5 mm. width and fibrillated after secondary stretching into 200 yarns of 500 denier and in another example of processing with the same apparatus, 300 yarns of 330 denier were obtained.

In each processing above-mentioned, not any broken ends were found in the cause of stretching, because of the absence of notches on the selvedges of each tape slitted. In case of a pigmented film, no unfavorable troubles were found in the course of the above-mentioned processess and the life of the blades were very long, contrary to the process using conventional way of slitting where a raw film before stretching was slitted by cutting or shearing and the slitted tapes obtained were apt to break in the course of stretching.

For producing fine denier yarns such as less than 300 denier, it was preferable that the film was made thinner, for instance, 0.03–0.04 mm. thick and the film, after primary stretching was slitted into tapes. 3–5 mm. wide.

As stated above, contribution of the present invention to the manufacture of split fiber yarn in the improvements of the operation rate and production efficiency was remarkable.

EXAMPLE 3

A film having a dimension equal to the one prepared in Example 2 was stretched with an apparatus illustrated in FIG. 2 under the same condition with that of Example 2, except that the heating was effected by hot air of 120° C. from the out side, amount of the circulating air was 10 cubic meters per minutes and the length of the heating chamber was 50 cm.

Uniform stretching of tubular film by 4 times was possible in the primary stretching as in case where the apparatus of FIG. 1 was used. Generally when a film was subjected to successive processes consisting of tubular film making, primary stretching, secondary stretching at a higher temperature, fibrillation and winding up of the product, there was observed hardly any slip between the nips of pinch rollers in the course of stretching, because of the existence of many sets of processing rollers in front of or behind each stretching unit, but in case where only stretching was tested without two or three driven braking rollers in front of taking up pinch rollers and behind feeding pinch rollers, there were occurred cases where desired ratio of stretching could not be attained due to slippage of the film at the nip of each pinch roller.

EXAMPLE 4

A tubular film of polyethylene terephthalate, having 0.03 mm. thickness and 11 cm. diameter, was shaped according to water quenching blown method of the present inventor, which method comprised extruding the above-mentioned polymer downwards through a die having an annular slit 10 cm. in diameter; inflating the extruded tubular film by 10% in diameter during the course of the descending film of 5 cm. from the die to the water surface of a circular water pool on a quenching vessel of about 3 cm. depth at 17° C. The quenching vessel was coaxially positioned with the die slit and had a thin elastomer bottom plate, at the bottom; said elastomer bottom plate had a hole at the center and was covered with expanded upper end of a cylindrical net; said expanded upper end of the net was fixed on the upper surface of the elastomer plate along a circle close to the outside periphery of the bottom plate and the other end of said net was suspended downward through the center hole of the elastomer bottom plate and to the end of which net a ring was fixed. By pulling of the ring downward an appropriate downward tension was imparted to the net so that the hole was made sufficiently larger by being deformed into a converging trumpet-like outlet as in FIG. 1b to match the diameter with that of the inflated tubular film passing therethrough.

After contacting with the quenching water in said pool by 3 mm., the tubular film travelled downward passing through the inside of the net, cooled further by the water leaking down through the meshes of the net covering the tubular film till the film solidified completely, and was taken up. The tubular film of polyethyleneterephthalate thus obtained at a speed of 20 meter per minute and having 0.03 mm. thickness and 11 cm. diameter, was stretched 4 times longitudinally with an apparatus illustrated in FIG. 1b, using hot water at 78° C. as a heating fluid. The film stretched was uniaxially well oriented and easily cleavable and had 0.015 mm. thickness and 172 mm. width after unfolded and opened. The film thus obtained was slitted into 10 tapes with 9 blades, arranged at a pitch of 17.2 mm. according to the method illustrated in FIG. 4 where the distance between a sliding bar and the row of blades was 30 mm. Each slitted tape was wound up on each bobbin having flanges on each end at a speed of 80 meter per minute.

With a laboratory testing machine, the tape on a bobbin was unwound and stretched further by 11% (total stretch ratio was 4.5 times) and heat-set, while passing through a hot air oven maintained at 190° C. It was then fibrillated by slide-rubbing over a revolving bar file under a tension with forming an angle of 80° between feeding direction and leaving direction of the tape to obtain 3600 denier split fiber yarn.

EXAMPLE 5

A film of nylon-6 was shaped and stretched longitudinally with the same apparatus and by almost the same conditions with those of Example 4, excepting that the temperature of secondary stretching and simultaneous heat setting was 180° C. The tape stretched by 4.5 times the original length was fibrillated in the same way as in the foregoing example to obtain 3000 denier split fiber yarn.

EXAMPLE 6

A tubular film of completely saponified polyvinylalcohol, having 30 cm. width in the flatly folded state and 0.05 mm. thickness was purchased from market and stretched by using an apparatus shown in FIG. 3. After passing through the feeding pinch rollers and over the upper circular guide at a speed of 20 meters per minute, the film was sprayed with a 40% solution of ammonium sulphate which had been maintained at 100° C. by ejecting the said solution onto the back surface of the shield made of stainless steel from the distributor through the tubular supporting shaft.

The film was stretched 5 times the original length longitudinally while said hot solution was flowing down along the inside surface of the film and cleft with a stainless steel blade before being taken-up at a speed of 100 meters per minute.

After take up, the film was unfolded and spread into a flat film 27 cm. wide, was wiped with a cloth to remove powder of ammonium sulphate covering the film after dried up and then was subjected to secondary stretching up to 6.25 times the original length before primary stretching, by passing through a hot air oven maintained at 190° C.

The film thus stretched was then subjected to fibrillation with a splitter to obtain split fiber web which was in the subsequent step, subjected to heat setting for 5 seconds on a rotating head drum maintained 216° C., while being insulated from outside cooling with a backing canvas, the surface of which drum was coated with fluorine containing polymer film. A split fiber web of completely saponified polyinvylalcohol which hardly shrank on dipping into hot water at 95° C. was obtained.

According to the method of the present invention, a tubular film is stretched, as it is, longitudinally in the primary stretching to an extent easily cleavable in the direction of its orientation. This is not only the most preferable method for obtaining a broad uniaxially well oriented film having hardly any trace of biaxial molecular orientation in the film, but is a method which prolongs the life of a blade for slitting the film, because of slitting being carried out by cleaving, not cutting, by said blade which is only a tool to induce cleavage.

Further, the apparatus illustrated in FIG. 3 is preferably used for stretching almost all known fiber formable polymer because of simplicity in construction, although all the apparatus illustrated in the drawings in this specification are likewise useful.

What is claimed is:

1. A method for producing at least one sheet of uniaxially oriented film having no appreciable extent of biaxial molecular orientation by after-stretching a tubular film longitudinally in the original tubular state which comprises feeding the tubular film of flatly pressed state vertically downwards after passing through nip of a feeding pinch roller means; sliding the tubular film over the outside periphery of a horizontal circular guide in order to recover the round state of the tubular film, which guide has a peripheral length nearly equal to the circumferential length of the film at least one hole for balancing the pressure in the inside of the space above the circular guide with the pressure of the outside atmosphere, is supported by a vertical supporting shaft at a position apart from the outlet of the feeding pinch roller means by at least the length equal to the diameter of the circular guide, is kept at a temperature as close as possible to the temperature of the outside atmosphere and has its center on the center axis of the tubular film; heating the tubular film uniformly up to a temperature sufficient for after-stretching while allowing the tubular film to travel downwards with a profile showing a number of loose wavy folds thereupon so as to start rapid stretching all at once from a circumferential line of the tubular film at substantially the same level with showing a necking appearance on the film; stretching the film longitudinally; cleaving the stretched film and taking up the cleft film by nip of a taking-up pinch roller means, the peripheral speed of which is determined by the desired ratio of after-stretching; the vertical elongated support of the cricular guide being inserted in the inside of the hollow tubular film through a gap formed by guide bars after cleaving; and the maximum diameter of the vertical support being smaller than that corresponding to a value calculated from dividing the original diameter of the film before after-stretching by square-root of the ratio of after-stretching.

2. A method according to claim 1, wherein the heating is carried out by an infra-red radiation heating.

3. A method according to claim 1, wherein the said cleaving is effected with a blade having an edge not so sharp and cleavage induced by the said cleaving is prevented from going aslant or too far in the feeding direction by allowing a ring to contact with the travelling tubular film before cleaving.

4. A method according to claim 1, wherein the heating is carried out by ejecting a hot fluid onto the circumference of the downwardly moving tubular film to heat the film for stretching.

5. A method according to claim 4, wherein the hot fluid is a hot water.

6. A method according to claim 4, wherein the hot fluid is a hot solution of a salt.

7. A method according to claim 4, wherein the hot fluid is a steam.

8. A method according to claim 4, wherein the hot fluid is a hot air.

9. A method according to claim 4 wherein the hot fluid is ejected uniformly onto the outside surface of the tubular film from a ring-shaped pipe having a number of small holes drilled horizontally on the inside periphery thereof and located on the top circumference of a heating chamber coaxially with the tubular film and the said heating chamber has a height sufficient to cover the necessary length for finishing the after-stretching of the film, a cover having a hole for introducing the tubular film into the chamber with a clearance as narrow as possible and a bottom hole having a diameter substantially equal to the diameter of the tubular film passing through this hole so as to keep the leakage of the fluid as little as possible.

10. A method according to claim 4, wherein said fluid is ejected uniformly onto the inside surface of the travelling tubular film from a distributor fixed on the supporting shaft of the circular guide together with a means which is used not to raise the temperature of the upper circular guide.

11. A method according to claim 4, wherein the hot fluid is a liquid and ejected uniformly onto the outside surface of the tubular film from a ring shaped pipe having a number of small holes drilled horizontally on the inside periphery thereof and located on the top circumference of a heating chamber coaxially with the tubular film and the said chamber has a height sufficient to cover the necessary length for finishing the after-stretching of the film, a cover having a hole for introducing the tubular film into the chamber with a clearance as narrow as possible and at the bottom of the said chamber an annnular elastomer plate having a hole in the center, which hole has a diameter smaller than that of the film passing therethrough, said elastomer plate being fixed onto a rigid bottom plate of the said chamber, which plate has also a hole larger than that of the elastomer plate, both the holes being concentrical to the center axis of travelling tubular film; the hole of the elastomer plate is covered with a cylindrical net, the upper end of which is expanded and fixed on the upper surface of the elastomer plate; the cylindrical net after passing through the hole suspends downwards, covering the tubular film already stretched out, at the lower end of which net, a ring having a diameter larger than that of the tubular film is fixed and by shifting the level of the ring along the traveling direction of the film, a tension imposed upon the net is regulated to change the opening degree of the elastomer hole, the end of which is deformed into a trumpet-like form, so as to make it correspond to the diameter of the tubular film passing therethrough; an elastomer ring band is placed in order to throttle the net sufficiently from outside along the circumference of the net at a short distance above the ring fixed to a lower end of the net, so that the net does not come apart from the outside surface of the film passing therethrough while allowing a certain quantity of heating liquid to leak through from the hole of the elastomer plate to insulate the film from being cooled by outside atmosphere.

12. A method for producing an at least one sheet of uniaxially well oriented film having hardly any appreciable extent of biaxial molecular orientation therein and suitable for preparing a strong split fiber web, which comprises subjecting a tubular film to the primary longitudinal after-stretching to an extent capable of being easily cleft, the said primary stretching comprising feeding the tubular film vertically downwards, after passing through nip of a feeding pinch roller means in a flatly pressed state, sliding the said film over the outside periphery of a horizontal circular guide in order to recover the round state of the tubular film, which guide has a peripheral length nearly equal to the circumferential length of the film, and at least one hole for balancing the pressure in the inside of the space above the circular guide with the pressure of the outside atmosphere, is supported by a vertical supporting shaft at a position apart from the outlet of the feeding pinch roller means by at least the diameter of the circular guide, is kept at a temperature as close as possible to the temperature of the outside atmosphere and has its center on the center axis of the travelling down tubular film; heating the film uniformly up to a temperature sufficient for after-stretching from the circumferential line of the tubular film lying at substantially the same level and separated from the circular guide by at least the diameter of the circular guide, while allowing the tubular film to travel downwards with a profile showing a number of large wavy loose folds thereon after sliding over the guide so as to start rapid stretching all at once from a circumferential line of the tubular film at a substantially the same level with showing a necking appearance on the film; stretching the film longitudinally cleaving the film thus stretched at one or more points where the after-stretching of the film is substantially finished, with a blade together with a ring for preventing the cleavage induced by the cleaving, from going aslant or too far in the feed direction; taking up the cleft film by nip of a taking up pinch roller means; the peripheral speed of which is determined by the desired ratio of the primary after-stretching of the tubular film; the said vertical supporting shaft being inserted into the inside of the said hollow tubular film in order to support the said upper circular guide through a gap on the tubular film formed by guide bars after cleaving, the maximum diameter of the vertical supporting shaft being smaller than that corresponding to a value calculated from dividing the original diameter of the tubular film before after-stretching by square root of the ratio of the primary after-stretching so that the film is capable of reducing the diameter freely in the course of the primary after-stretching and subjecting the stretched film obtained in the primary stretching to the secondary longitudinal after-stretching at a temperature higher than that of the primary after-stretching after spread into a broad flat film, the said secondary after-stretching being carried out between a feeding pinch roller means and a taking up pinch roller means, the peripheral speed of which is faster than that of the feeding pinch roller means and is determined by the ratio of the secondary after-stretching.

13. A method according to claim 12, wherein a broad flat film, having finished primary after-stretching is slitted before secondary longitudinal after-stretching continuously into a number of tapes having a desired width by cleaving with blades, having not so sharp edges, arranged and fixed in a row, with inserted distance pieces of predetermined thickness between each side face of the blades, on a shaft perpendicular to the path of the film fed into the secondary after-stretching step so as to pierce the film with the edge of each of said blades and means to deflect the travelling direction of the film positioned at a short distance ahead and parallel to the row of the blades and the tapes thus slitted is subjected to secondary after-stretching while travelling side by side in parallel arrangement to obtain a number of strong uniaxially well oriented tapes suitable for preparing split fiber yarns.

14. A method according to claim 12, wherein, a broad flat film, having finished secondary after-stretching, is slitted continuously into a number of tapes, having a desired width, with blades, having not so sharp edges, arranged and fixed in a row with inserted distance pieces of predetermined thickness between each side face of the blades on a shaft perpendicular to the path of the film before taking up so as to pierce the film with the edge of each of the blades and means to deflect the travelling direction of the film positioned at a short distance ahead and parallel to the row of the blades and the tapes thus slitted is subjected to taking up to obtain a number of strong uniaxially well oriented tapes.

References Cited

UNITED STATES PATENTS

| | | | |
|---|---|---|---|
| 3,179,326 | 4/1965 | Underwood et al. | 18—14(S)UX |
| 3,187,982 | 6/1965 | Underwood et al. | 264—95X |
| 3,313,870 | 4/1967 | Yazawa | 264—290X |
| 3,499,064 | 3/1970 | Tsuboshima et al. | 18—14(S)X |

FOREIGN PATENTS

| | | | |
|---|---|---|---|
| 211,133 | 12/1955 | Australia | 264—146 |
| 1,061,136 | 3/1967 | Great Britain | 264—146 |

ROBERT F. WHITE, Primary Examiner

T. J. CARVIS, Assistant Examiner

U.S. Cl. X.R.

264—146, 210, 290, Dig. 47; 18—1; 83—425